United States Patent
Balinski et al.

(10) Patent No.: US 10,120,571 B2
(45) Date of Patent: *Nov. 6, 2018

(54) IMPLEMENTING MULTI-TENANCY QUALITY OF SERVICE USING CONTROLLERS THAT LEVERAGE DISK TECHNOLOGIES

(71) Applicant: International Business Machines Corporation, Armonk, NY (US)

(72) Inventors: Peter A. Balinski, Elmhurst, NY (US); Sasikanth Eda, Andhra Pradesh (IN); John G. Musial, Newburgh, NY (US); Sandeep R. Patil, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 41 days.

This patent is subject to a terminal disclaimer.

(21) Appl. No.: 14/950,999

(22) Filed: Nov. 24, 2015

(65) Prior Publication Data
US 2017/0090765 A1 Mar. 30, 2017

Related U.S. Application Data

(63) Continuation of application No. 14/865,579, filed on Sep. 25, 2015.

(51) Int. Cl.
*G06F 12/00* (2006.01)
*G06F 3/06* (2006.01)
(52) U.S. Cl.
CPC .......... *G06F 3/0604* (2013.01); *G06F 3/0643* (2013.01); *G06F 3/0659* (2013.01); *G06F 3/0689* (2013.01)

(58) Field of Classification Search
CPC .... G06F 3/0604; G06F 3/0659; G06F 3/0643; G06F 3/0689
See application file for complete search history.

(56) References Cited

U.S. PATENT DOCUMENTS

| 5,953,300 A * | 9/1999 | Serizawa | G11B 19/26 369/124.14 |
| 7,721,022 B2 * | 5/2010 | Brewer | G06F 3/0605 710/36 |

(Continued)

OTHER PUBLICATIONS

List of IBM Patents or Patent Applications Treated as Related; (Appendix P), Filed Jul. 26, 2017, 2 pages.

*Primary Examiner* — Mark A Giardino, Jr.
(74) *Attorney, Agent, or Firm* — Cantor Colburn LLP; Kurt Goudy

(57) ABSTRACT

An integrated controller for implementing a quality of service when storing input/output data across an array is provided. The integrated controller receives the input/output data from at least one of a file system and an upper layer application. The input/output data can be associated with a quality of service classification. The integrated controller also splits the input/output data into data chunks and determines whether the quality of service classification indicates a first priority or a second priority for each of the data chunks. Then, if the quality of service classification indicates the first priority, the integrated controller proceeds to place the data chunks across a first partition of a disk of the array.

5 Claims, 8 Drawing Sheets

Interface 300

(56) References Cited

U.S. PATENT DOCUMENTS

| | | | |
|---|---|---|---|
| 8,732,148 B2* | 5/2014 | Jensen | G06F 3/0613 |
| | | | 707/705 |
| 2002/0095546 A1* | 7/2002 | Dimitri | G11B 20/1217 |
| | | | 711/112 |
| 2011/0161406 A1* | 6/2011 | Kakeda | G06F 3/0604 |
| | | | 709/203 |
| 2017/0090758 A1 | 3/2017 | Balinski et al. | |

* cited by examiner

System 600

IMPLEMENTING MULTI-TENANCY QUALITY OF SERVICE USING CONTROLLERS THAT LEVERAGE DISK TECHNOLOGIES

DOMESTIC PRIORITY

This application is a continuation of U.S. application Ser. No. 14/865,579, filed on Sep. 25, 2015, the disclosure of which is incorporated by reference herein in its entirety.

BACKGROUND

The present disclosure relates generally to disk technologies, and more specifically, to implementing multi-tenancy quality of service using controllers that leverage large disk technology, such as shingled magnetic recording disks.

Hard disks are a vital unit of a cloud ecosystem. As cloud ecosystems evolve, so must the overall speed, capacity, and reliability of these hard disks. Further, as hard disks evolve, the shortcomings of hard disk management must be addressed. For instance, while hard disk management is generally performed by contemporary redundant array of inexpensive/independent disks (RAID) controllers, contemporary RAID controllers generally do not support Quality of service (QoS). QoS is a service technology where transmission rates, error rates, and other characteristics are measured, improved, and/or guaranteed in advance. Thus, as the cloud ecosystems evolve and require QoS support to improve the operations of the hard disks underlying the ecosystems, contemporary RAID controllers are proven to be inefficient as a management tool for these hard disks.

For example, contemporary hard disk implementations are available at large capacities, such as a shingled magnetic recording disks with ten terabyte capacity. Due to their physical size with respect to capacity, these implementations have an inherent problem of a significant speed gap between tracks on the disks themselves. That is, contemporary benchmarks indicate that speed ratios are close to a 100/60 ratio between outer and inner tracks of a large disk (e.g., a large disk can be capable of 120 megabytes per sec on the outer tracks and yield 72 megabytes per sec on the inner tracks). Since the contemporary RAID controllers cannot provide the QoS support, a management tool is needed to provide QoS support with respect to the speed gap while managing the operations of contemporary hard disk implementations underlying cloud ecosystems.

SUMMARY

Embodiments include a method, system, and computer program product for implementing a quality of service when storing input/output data across an array is provided. The integrated controller receives the input/output data from at least one of a file system and an upper layer application. The input/output data can be associated with a quality of service classification. The integrated controller also splits the input/output data into data chunks and determines whether the quality of service classification indicates a first priority or a second priority for each of the data chunks. Then, if the quality of service classification indicates the first priority, the integrated controller proceeds to place the data chunks across a first partition of a disk of the array.

Additional features and advantages are realized through the techniques of the present disclosure. Other embodiments and aspects of the disclosure are described in detail herein.

For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
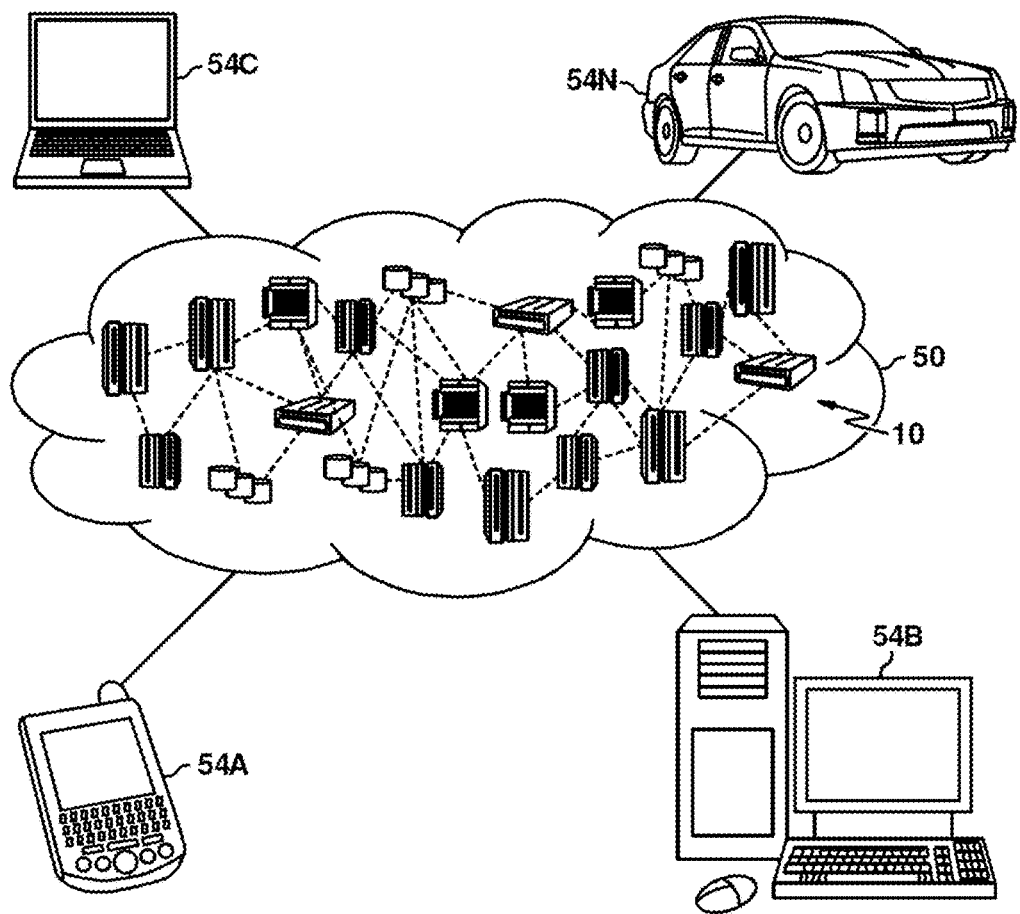
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
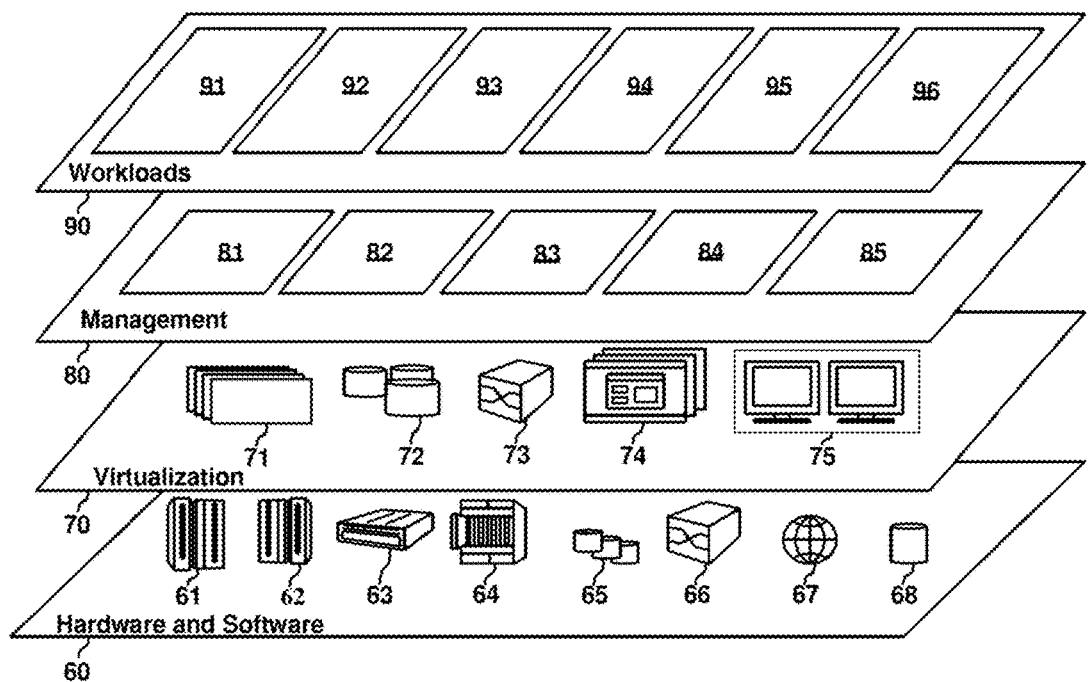
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

In view of the above, embodiments described herein relate to disk technologies, and more specifically, to implementing multi-tenancy quality of service using controllers that leverage large disk technology, such as shingled magnetic recording disks. For instance, a system, method, and/or computer program product can implement a management tool comprising an algorithm integrated into a redundant array of inexpensive/independent disks (RAID) controller (herein referred to as an integrated controller). This integrated controller executes the algorithm to enable secure multi-tenancy and to provide QoS support for hard disks underlying cloud based environments. Further, the QoS support by the integrated controller can comprise leveraging speed variations that arise in the hard disks due to these being of a large capacity.

In general, large disk technology can relate to hard disk drives with a large capacity (i.e., greater than 10 GB) and a thin density. Example of large disk technologies include, shingled magnetic recording disks, which are high capacity, low density drives; perpendicular magnetic recording disks; longitudinal magnetic recording disks; etc. Large disk technology can further employ a RAID architecture. RAID is a data storage virtualization technology that combines multiple physical disk drive components into a single logical unit (e.g., large disk environment) that provides data redundancy, performance improvement, or both. For example, software RAID combines multiple hard drives as one large hard drive with varying benefits depending on RAID scheme or RAID level being used. A RAID controller manages how data is stored and accessed across the single logical unit. The RAID controller also ensures that operating systems only see logical drives and does not manage (or detect) the underlying RAID schema. Note the contemporary RAID controllers generally do not know QoS support.

With respect to speed variations, it will be appreciated that hard drives of large disk and/or cloud based environments are faster on an outer area of the drive than an inner area because the hard drives use a constant data density based on the circle circumference formula (i.e., circumference=n*diameter). In this way, the outer area can be about twice the circumference of the inner area, which means that twice the data will pass under read/write heads of the hard drive with each disk rotation, though the entire drive assembly rotates at a fixed revolutions per second (i.e., angular velocity is constant). That is, while the average rotational latency will be the same for all areas (since the angular velocity is the same in all cases), the outer area will have a faster linear velocity than the inner area.

As noted above, the integrated controller comprises the algorithm that enables secure multi-tenancy and provides QoS support, to provide erasure coding as well as contemporary fixed layouts. Operations of the integrated controller and the integrated controller itself can be implemented in hardware or software with faster response times and greater customizations than contemporary implementations.

The integrated controller can utilize additional storage of memory locations to manage boundaries of disk tracks (e.g., inner vs. outer areas). The integrated controller can also receive the RAID QoS configuration inputs from the end user (e.g., that designate to configure two QoS based tenants, three QoS based tenants, etc.). In turn, the integrated controller can facilitate read/write/byte placement according to a selected QoS. The integrated controller can further account for disk layouts involved for RAID array creation (a traditional fixed layout topology or can be an erasure coding based layout) and, based on the layout per disk, identify and record the inner, outer disk.

As noted, the integrated controller utilizes multi-tenancy and QoS support to supply different service levels with respect to the boundaries as they relate to the speed variation of hard drives. To enable multi-tenancy, the algorithm of the integrated controller can include erasure coding (as well as traditional fixed layout based) that determines and manages boundaries with respect to a plurality of disk tracks (e.g., an inner partition vs. an outer partition as described below).

To provide QoS support, the algorithm of the integrated controller can further perform read/write/byte placements according to a QoS layout. QoS layouts can comprise a number of partitions and a priority associated with each partition. The number of partition can be any integer value greater than one and can vary based on a desired configuration. The priority generally decreases from the outmost partition to the inner most partition. For example, if the number of partitions is 2, then an outer partition would have a higher priority with respect to an inner partition because the data on the outer partition can be read faster than the data on the inner partition.

Figure 3:
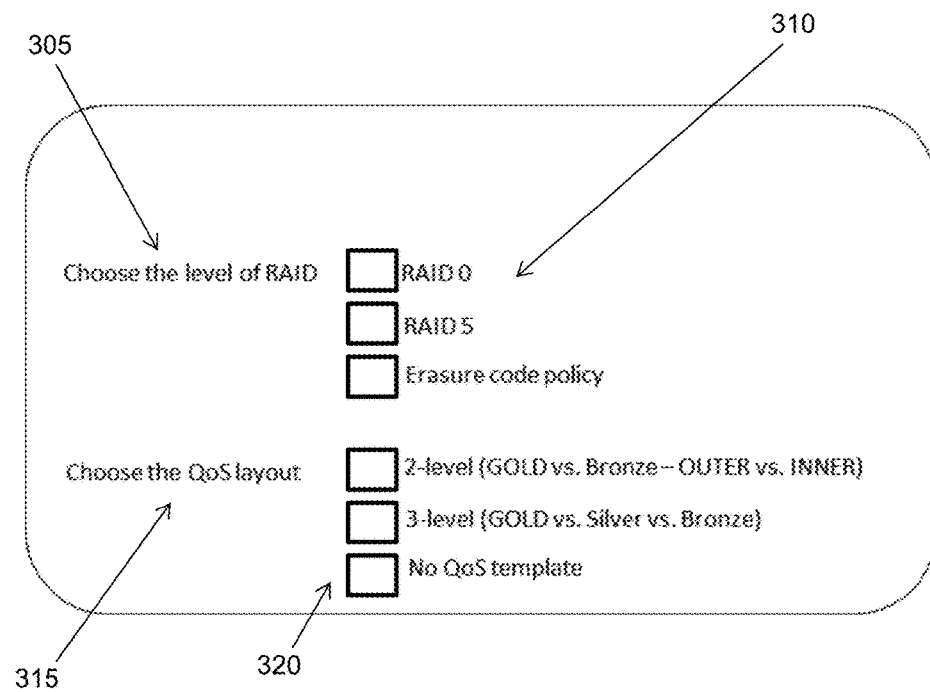
FIG. 3 depicts a large capacity hard disk in accordance with an embodiment

The QoS layout of the integrated controller, along with the erasure coding and RAID level, can be configurable. Turning now to FIG. 3, a graphical user interface is generally shown as an interface 300 for configuring the integrated controller in accordance with an embodiment. The interface 300 comprises a 'Choose the level of RAID' menu 305 that includes selections 310. The selections 310, as shown, include 'RAID 0,' 'RAID 5,' and 'Erasure code policy.' RAID levels comprise a set of RAID configurations that employ the techniques of striping, mirroring, or parity to create large reliable data stores from multiple general-purpose computer hard disk drives (e.g., disk 300). For example, RAID levels can include RAID 0 (striping), RAID 1 (mirroring), RAID 5 (distributed parity), and RAID 6 (dual parity).

When RAID 0 is selected, the integrated algorithm splits or stripes data evenly across two or more disks, without parity information, redundancy, or fault tolerance.

Figure 5:
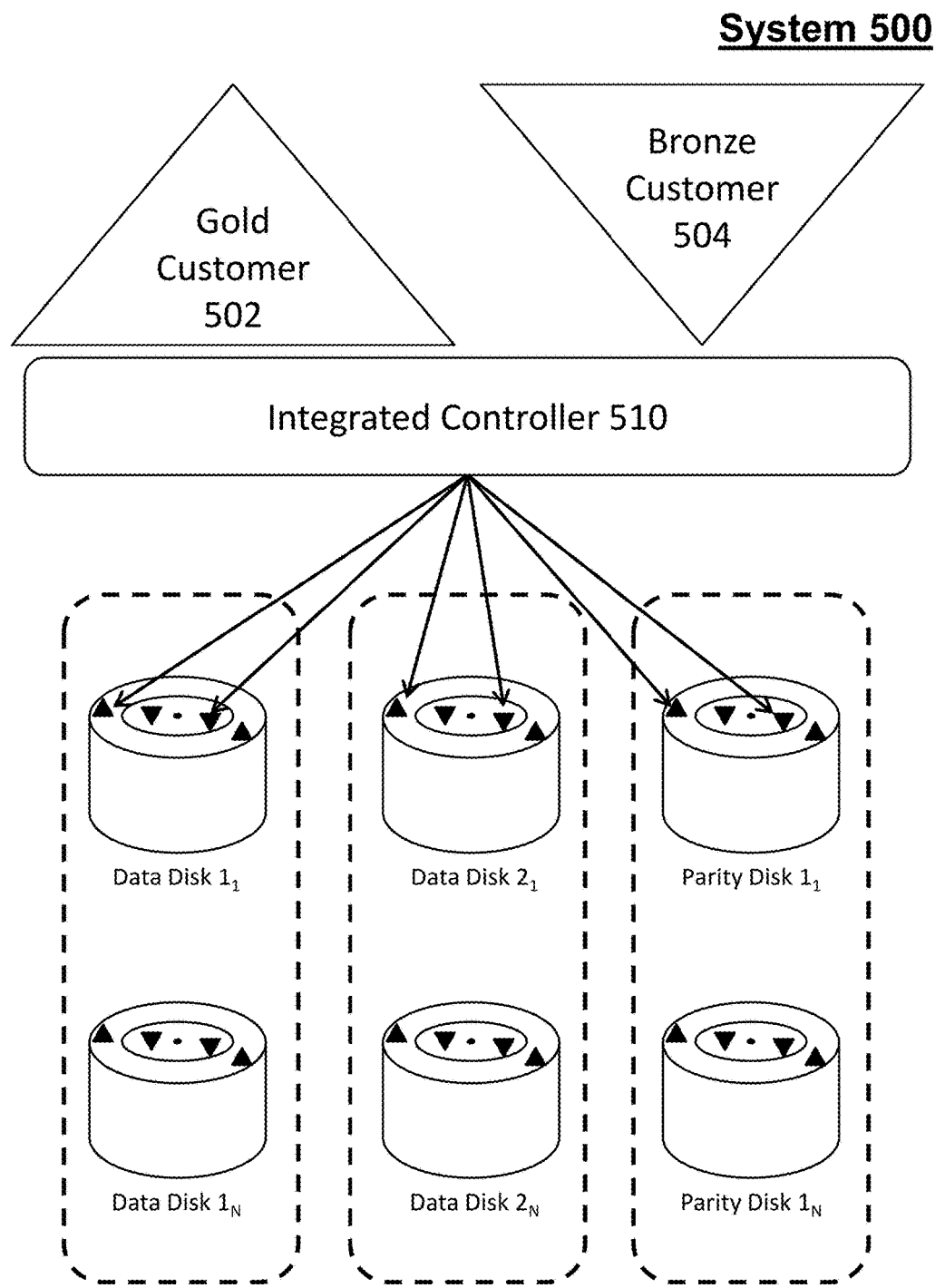
FIG. 5 depicts a system for implementing an integrated controller in accordance with an embodiment.

When the RAID 5 is selected, the integrated algorithm facilitates a fixed topology (i.e., contains 3 data disks and 1 parity disk) for multi-tenant cloud environment. As shown in FIG. 5, a system 500 in accordance with an embodiment includes a RAID array (e.g., Data Disk $1_1$ to Parity Disk $1_N$).

When the 'Erasure code policy' is selected, the integrated algorithm facilitates an erasure coding topology. In general, erasure coding is a data protection operation including breaking data into fragments that are then expanded and encoded with redundant data pieces. These fragments are stored across a disk array, for example, as shown in system 600 (e.g., Disk-1 to Disk-N) of FIG. 6 in accordance with an embodiment. A technical benefit of the erasure coding employed herein is that corrupted data on a first location of the disk array can be reconstructed by using information in a second location on the disk array corresponding to the corrupted data. Further, the erasure coding employed herein reduces the time and overhead required to reconstruct data and can be useful with large quantities of data and any applications or systems that need to tolerate failures, such as disk array systems (e.g., the system 600), object-based cloud storage, etc. In this way, the erasure coding employed herein describes a set of numbers that can be checked for accuracy and recovered if one is lost. For instance, the protection offered by erasure coding can be represented by: n=k+m, where "k" is a variable indicating an original amount of data or symbols, "m" is a variable for extra or redundant symbols that are added to provide protection from failures, and "n" is a variable indicating a total number of symbols created after the erasure coding operation. For instance, a 16/9 policy includes a total of 16 disks, and can provide reliability till 9 disks fail, as the actual data bits equals 9 and encoded and expanded to 16 bits.

The interface 300 also comprises a 'Choose the QoS layout' menu 315 that includes selections 320. The selections 320, as shown, include '2-level,' '3-level,' and 'No QoS template.' Note that this interface 300 is illustrative only, and the number and types of menus and corresponding selections can vary as needed.

Figure 4:
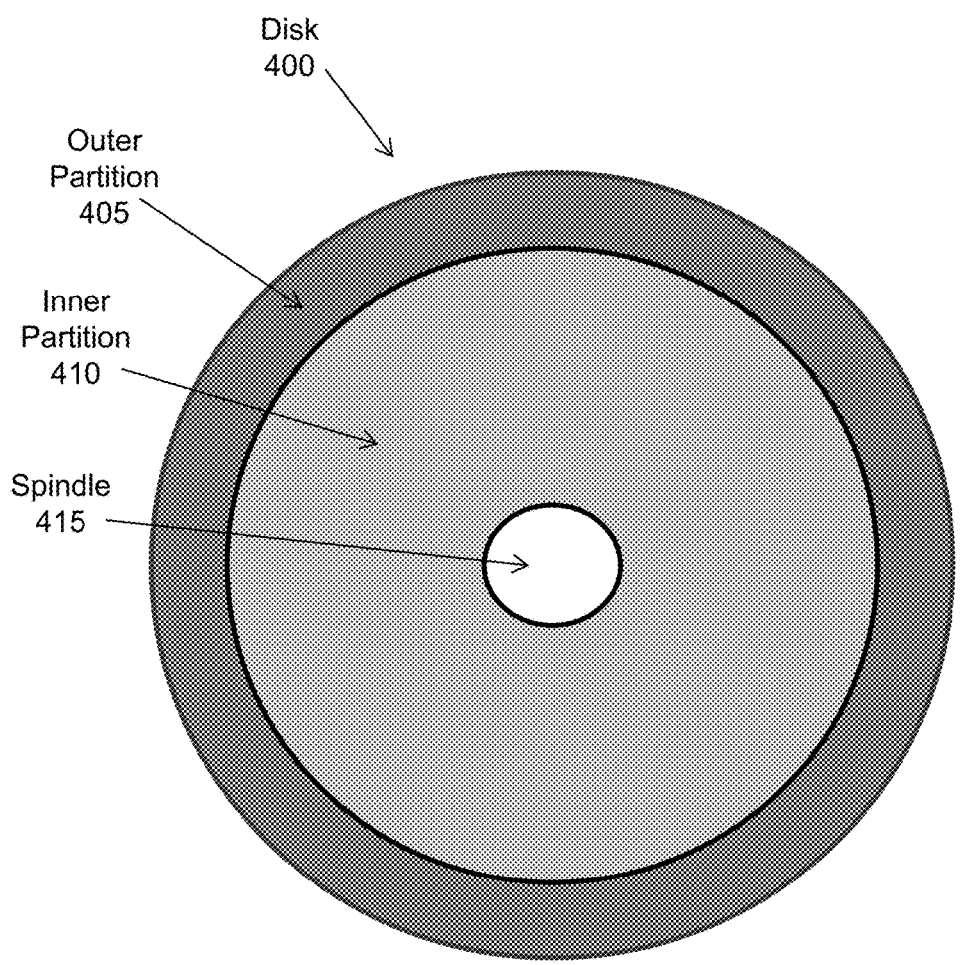
FIG. 4 depicts a graphical user interface for interacting with an integrated controller in accordance with an embodiment.

When the '2-level' QoS layout is selected from the 'Choose the QoS layout' menu 315, the disk is partitioned into two areas, each of which is assigned a priority. For example, FIG. 4 illustrates a large capacity hard disk as a disk 400 in accordance with an embodiment. The disk 400 includes an outer partition 405 or first level, an inner partition 410 or second level, and a spindle 415 that is a center section of the disk 400 and that enables disk rotate. The outer partition 405 is the fastest area of the disk 400. That is, the inner partition 410 is a comparatively slower area than the outer partition 405. Thus, reading a sector on a track of the outer partition 405 would be "faster" than reading a sector on a track of a track of the inner partition 410.

Utilizing the '2-level' QoS layout, the integrated controller can separately manage these two sections (partitions 405, 410) of the disk 400 for separate customer levels. As seen in FIG. 3, gold and bronze priorities can be associated with outer and inner areas. In turn, a gold priority can be assigned to the outer partition 405, and a bronze priority can be assigned to the inner partition 410. Thus, a customer who desires faster access can choose or pay for a gold priority access, while a customer who is not particular about data access speed may choose a bronze priority access. In this way, 'gold' customer data bytes are read/written from array prepared out of 'outer' disk tracks, while 'bronze' customer data bytes are read/written from array prepared out of 'inner' disk tracks.

In view of the above and with reference to FIG. 5, an operational example will now be described in accordance with an embodiment. As shown in FIG. 5, the system 500 in accordance with an embodiment includes a gold customer 502, a bronze customer 504, the integrated controller 510, and the RAID array (e.g., Data Disk $1_1$ to Parity Disk $1_N$). In operation, the integrated controller 510 tracks boundaries (upper and lower offsets) per disk participating in the RAID array.

For instance, if the '2-level' QoS layout is configured at the integrated controller 510 (i.e., selected from the interface 300), outer disk tracks can be defined from N to N-60, while the inner disk tracks can be defined from N-61 to 0. Then, in accordance with the '2-level' QoS layout, the data bytes are read/written from appropriate track boundaries by the integrated controller 510. For instance, for the gold customer 502, all the data bytes are placed within the outer track boundaries from N to N-60 of all the disks involved in the RAID array (note the matching point-side-up triangles). Further, for the bronze customer 502, all the data bytes are placed within the inner track boundaries from N-61 to 0 of all the disks involved in the RAID array (note the matching point-side-down triangles).

Figure 6:
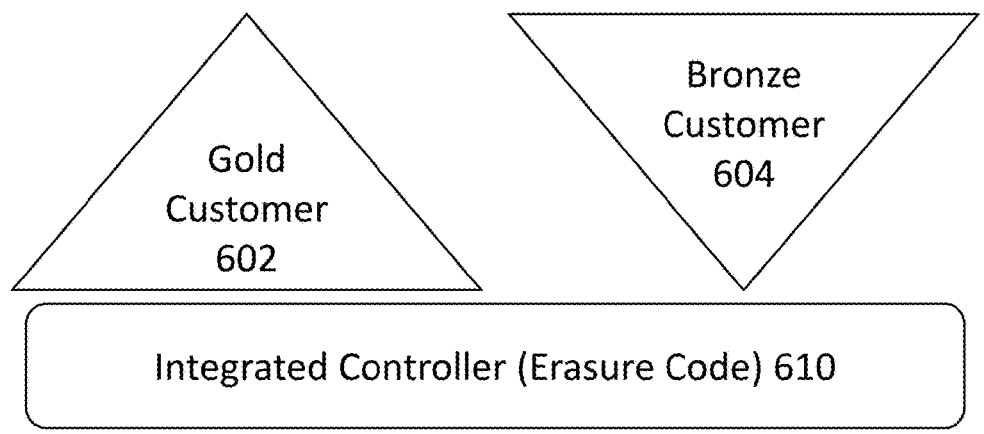
FIG. 6 depicts another system for implementing an integrated controller in accordance with an embodiment.
Figure 6:
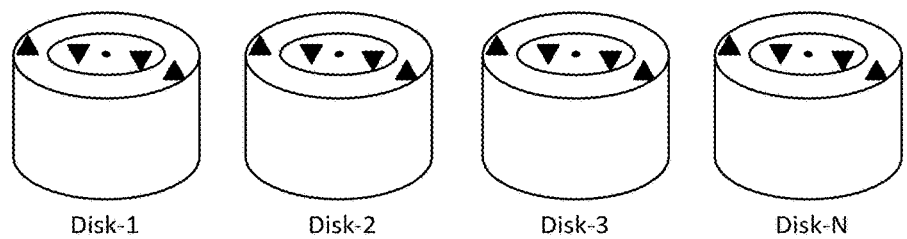

In view of the above and with reference to FIG. 6, another operational example will now be described in accordance with an embodiment. As shown in FIG. 6, the system 600 in accordance with an embodiment includes a gold customer 602, a bronze customer 604, the integrated controller 610, and the disk array (e.g., Disk-1 to Disk-N). In operation, the integrated controller 610 places data on to the disk tracks of the disk array based on the '2-level' QoS layout (i.e., gold customers bytes placed on outer disk tracks N to N-60; bronze customers bytes placed on inner disk tracks N-61 to 0). Thus, when 4 disks are present, the integrated controller 610 identifies and records the inner, outer disk track boundaries per disk in accordance with Table 1.

TABLE 1

4 disk array with 2-Level QoS layout:

| Disks involved in Raid | Outer track (high sector) | Outer Track (low sector) | Inner Track (high sector) | Inner Track (low sector) |
|---|---|---|---|---|
| Data-1 | N (last sector) | N − 60 | N − 61 | 0 (first sector) |
| Data-2 | N | N − 40 | N − 41 | 0 |
| Data-3 | N | N − 60 | N − 61 | 0 |
| Data-4 | N | N − 60 | N − 61 | 0 |

Figure 7:
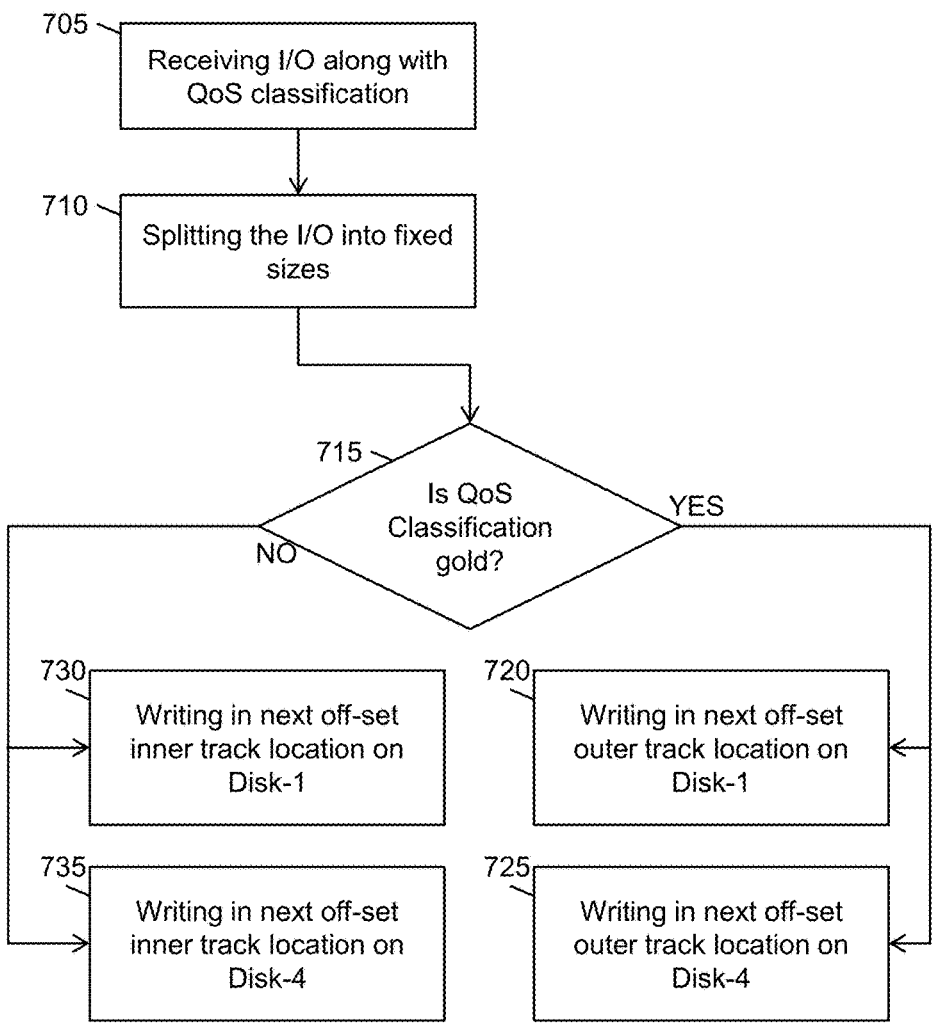
FIG. 7 depicts a process flow performed by a system incorporating an integrated controller in accordance with an embodiment.

Turning now to FIG. 7, a process flow 700 performed by the system 600 incorporating the integrated controller 610 in accordance with an embodiment will now be described. The process flow 700 begins at block 705, where the integrated controller 610 receives input/output (I/O) from file system or upper layer application in communication with the system 600. Along with the I/O, the integrated controller 610 receives a QoS classification of the I/O. Next, at block 710, the integrated controller 610 splits the I/O into chunks of a fixed data size in preparation for storing on the disk array. Then, at decision block 715, the integrated controller 610 checks the QoS classification received with the I/O to determine if the QoS classification is gold.

As indicated by the YES Arrow, if the QoS classification is gold, the process flow 700 proceeds to blocks 720 and 725. At block 720, the integrated controller 610 writes each I/O chunk in the next seek offset of the outer track on Disk-1 starting with track N. While writing to Disk-1, the integrated controller 610 can manage and/or increment a first counter. The first counter identifies which or the next outer track of Disk-1 to write to for the integrated controller 610. At block 725, the integrated controller 610 also writes each I/O chunk in the next seek offset of the outer track on Disk-4 starting with track N. While writing to Disk-4, the integrated controller 610 can manage and/or increment a second counter. The second counter identifies which or the next outer track of Disk-4 to write to for the integrated controller 610.

As indicated by the NO Arrow, if the QoS classification is not gold, the process flow 700 proceeds to blocks 730 and 735. At block 730, the integrated controller 610 writes each I/O chunk in the next seek offset of the inner track on Disk-1 starting with track N-61. While writing to Disk-1, the integrated controller 610 can manage and/or increment a third counter. The third counter identifies which or the next outer track of Disk-1 to write to for the integrated controller 610. At block 735, the integrated controller 610 also writes each I/O chunk in the next seek offset of the inner track on Disk-4 starting with track N-61. While writing to Disk-4, the integrated controller 610 can manage and/or increment a fourth counter. The fourth counter identifies which or the next outer track of Disk-4 to write to for the integrated controller 610.

Returning to FIG. 3, when the '3-level' QoS layout is selected from the 'Choose the QoS layout' menu 315, the disk is partitioned into three areas, each of which is assigned a priority. In turn, an outer or first partition can have a higher priority with respect to an intermediate or second partition because the data on the first partition can be read faster than data on the second partition. Further, the second partition would have a higher priority with respect to an inner or third partition because the data on the second partition can be read faster than data on the third partition.

As indicated by the selections 320 in FIG. 3, a gold priority can be assigned to the first partition, a silver priority can be assigned to the second partition, and a bronze priority can be assigned to the third partition. Thus, gold customer data bytes are read/write from array prepared out of 'outer' disk tracks, while silver customer data bytes are read/write from array prepared out of 'intermediate' disk tracks and bronze customer data bytes are read/write from array prepared out of 'inner' disk tracks.

Figure 8:
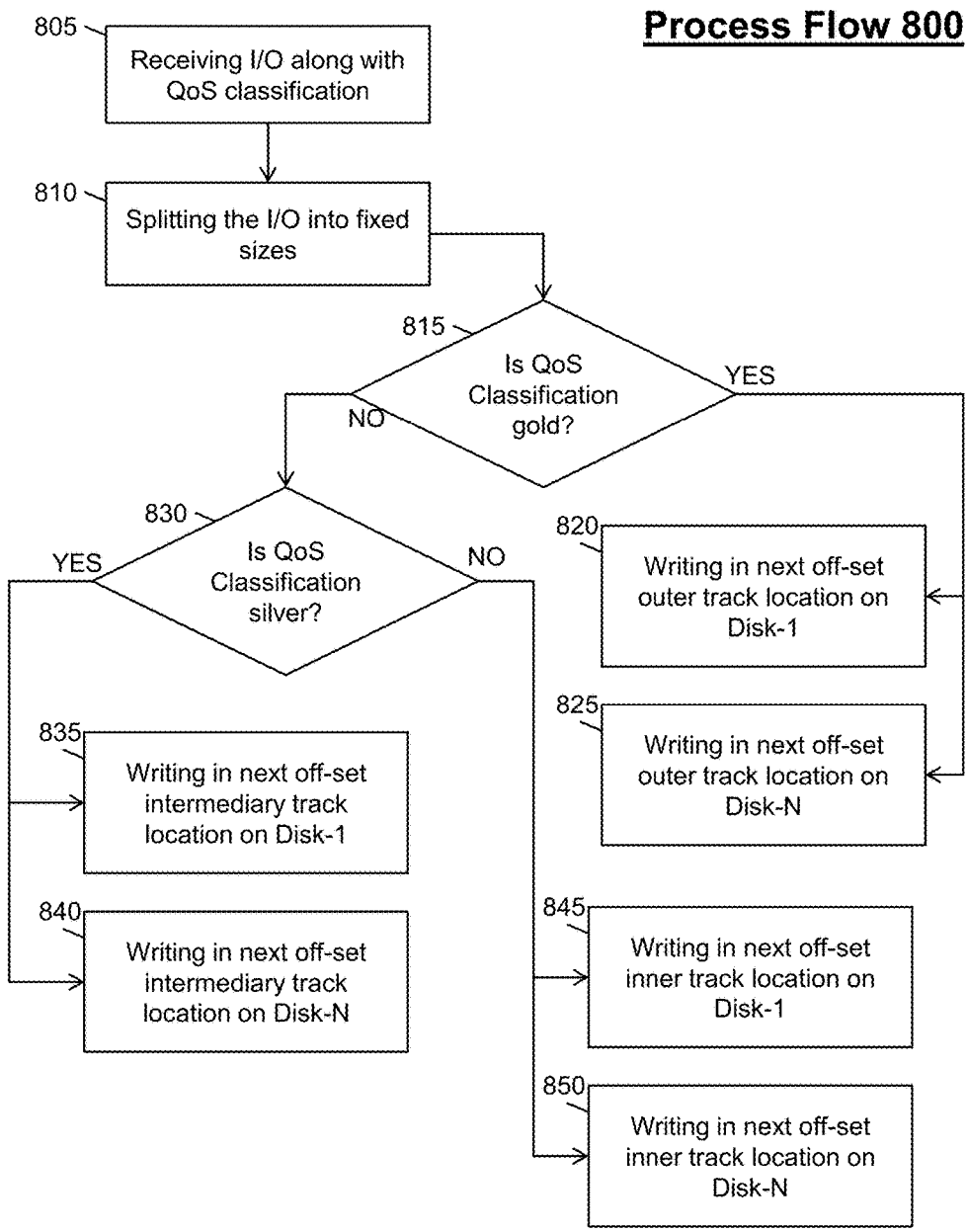
FIG. 8 depicts another process flow performed by a system incorporating an integrated controller in accordance with an embodiment.

Turning now to FIG. 8, a process flow 800 performed by the system 600 incorporating the integrated controller 610 in accordance with an embodiment will now be described. The process flow 800 relates to when the '3-level' QoS layout is selected from the 'Choose the QoS layout' menu 315.

The process flow 800 begins at block 805, where the integrated controller 610 receives input/output (I/O) from file system or upper layer application in communication with the system 600. Along with the I/O, the integrated controller 610 receives a QoS classification of the I/O. Next, at block 810, the integrated controller 610 splits the I/O into chunks of a fixed data size in preparation for storing on the disk array. At decision block 815, the integrated controller 610 checks the QoS classification received with the I/O to determine if the QoS classification is gold.

As indicated by the YES Arrow, if the QoS classification is gold, the process flow 800 proceeds to blocks 820 and 825. At block 820, the integrated controller 610 writes each I/O chunk in the next seek offset of the outer track on Disk-1. While writing to Disk-1, the integrated controller 610 can manage and/or increment a first counter. The first counter identifies which or the next outer track of Disk-1 to write to for the integrated controller 610. At block 825, the integrated controller 610 also writes each I/O chunk in the next seek offset of the outer track on Disk-N. While writing to Disk-N, the integrated controller 610 can manage and/or increment a second counter. The second counter identifies which or the next outer track of Disk-N to write to for the integrated controller 610.

As indicated by the NO Arrow, if the QoS classification is not gold, the process flow 800 proceeds to decision block 830. At decision block 815, the integrated controller 610 checks the QoS classification received with the I/O to determine if the QoS classification is silver.

As indicated by the YES Arrow, if the QoS classification is silver, the process flow 800 proceeds to blocks 835 and 840. At block 835, the integrated controller 610 writes each I/O chunk in the next seek offset of an intermediary track on Disk-1. While writing to Disk-1, the integrated controller 610 can manage and/or increment a third counter. The third counter identifies which or the next outer track of Disk-1 to write to for the integrated controller 610. At block 840, the integrated controller 610 writes each I/O chunk in the next seek offset of the intermediary track on Disk-N. While writing to Disk-N, the integrated controller 610 can manage and/or increment a fourth counter. The fourth counter identifies which or the next outer track of Disk-N to write to for the integrated controller 610.

As indicated by the NO Arrow, if the QoS classification is not silver, the process flow 800 proceeds to blocks 845 and 850. At block 845, the integrated controller 610 writes each I/O chunk in the next seek offset of the inner track on Disk-1. While writing to Disk-1, the integrated controller 610 can manage and/or increment a fifth counter. The fifth counter identifies which or the next outer track of Disk-N to write to for the integrated controller 610. At block 850, the integrated controller 610 writes each I/O chunk in the next seek offset of the inner track on Disk-N. While writing to Disk-N, the integrated controller 610 can manage and/or increment a sixth counter. The sixth counter identifies which or the next outer track of Disk-N to write to for the integrated controller 610.

Returning to FIG. 3, when the 'No QoS template' is selected from the 'Choose the QoS layout' menu 315, the disk is not partitioned. In turn, the integrated controller can perform read/write operations to the entirety of the disk without regard to priority levels.

In addition, based on the incoming data bytes from the end user, a file-system can sends user information along with the data bytes stream to the integrated controller. Further, the algorithm of the integrated controller decides on an offset address for data byte placement. Table 2 indicates an offset address selection by the algorithm.

TABLE 2

| | Off-set address location | |
|---|---|---|
| User Owned | Initial Off-set | Next Off-set location |
| Gold | N − 1 | N02 |
| Bronze | 0 + 1 | 0 + 2 |
| Bronze | 0 + 2 | 0 + 3 |
| Gold | N − 2 | N03 |

In accordance with an embodiment, the integrated controller can be implemented as a method, system, and/or computer program product. The integrated controller can be an erasure coding controller, which includes erasure coding supported as well as RAID in traditional fixed disk layout based, that facilitates configuring and adhering to QoS tier at erasure coding level (e.g., creating inner vs. outer track boundaries on large disk that is based on the QoS classification and influencing erasure coding); receiving I/O blocks/chunks along with corresponding QoS details from file system or upper layer application; utilizing the QoS details during erasure coding process (where the process places the blocks/chunk across disk(s)); and monitoring the partition boundaries (inner vs. outer) of each disk configured for erasure coding, while selecting the track to place all the erasure coding blocks/chunk according to the QoS details associated with the blocks (where generally the outer tracks map to a higher QoS).

Technical effects and benefits of the integrated controller include enabling secure multi-tenancy and providing QoS support (particularly where the QoS support can comprise leveraging the speed variations that arise in the hard disks underlying the cloud based environments). Thus, embodiments described herein are necessarily rooted in hard disk controllers to perform proactive operations to overcome problems specifically arising in the realm of disk technologies (e.g., these problems include the limitations on contemporary RAID controllers, resulting in under utilized disk arrays). For example, while contemporary hard disk implementations are non-optimal, the embodiments herein include erasure coding supported as well as RAID in traditional fixed disk layout that can operate within evolving cloud ecosystems.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for implementing a quality of service when storing input/output data across a redundant array of independent disks, comprising:

receiving, by an integrated controller, a classification input designating a quality of service layout for the redundant array of independent disks, the quality of service layout for the array being a three level layout comprising a first partition, a second partition, and an intermediary partition between the first and second partitions disks, the integrated controller utilizes user information along with a data bytes stream in connection with a plurality of counters to determine an offset address for data byte placement according to the quality of service layout, wherein the classification input comprises 2-level selection, 3-level selection, or No QoS template selection, wherein the 2-level selection comprises the redundant array of independent disks being partitioned into two areas, wherein the 3-level selection comprises the redundant array of independent disks being partitioned into three areas, wherein the No QoS template selection comprises the redundant array of independent disks not being partitioned;

receiving, by the integrated controller, the input/output data from at least one of a file system and an upper layer application, the input/output data being associated with the quality of service layout;

splitting, by the integrated controller, the input/output data into data chunks;

determining, by the integrated controller, whether the quality of service layout indicates a first priority or a second priority for each of the data chunks;

placing, by the integrated controller, each of the data chunks across a first partition of a first disk of the redundant array of independent disks and in a first partition of a second disk of the redundant array of independent disks when the quality of service layout indicates the first priority;

placing each of the data chunks across a second partition of the first disk of the redundant array of independent disks and in a second partition of the second disk of the redundant array of independent disks when the quality of service layout indicates the second priority; and receiving, as an input, a redundant array of independent disks level designating an erasure code policy for the redundant array of independent disks, the erasure code policy being represented by $n=k+m$, where k is a variable comprising an original amount of the data chunks, "m" is a variable comprising redundant data added to the original amount of the data chunks to provide protection from failures, and "n" is a variable comprising a total number of the data chunks, wherein the erasure code policy comprises expanding and encoding the data chunks with redundant data pieces, reconstructing corrupted data chunks on a first location of the redundant array of independent disks by using information in a second location on the redundant array of independent disks corresponding to the corrupted data chunks, and checking the data chunks for accuracy and recovering any of the data chunks when lost.

2. The method of claim 1, wherein the first priority is a higher priority than the second priority and the first partition is an outer partition.

3. The method of claim 1, wherein the second priority is a lower priority than the first priority and the second partition is an inner partition.

4. The method of claim 1, wherein the integrated controller is a redundant array of independent disks controller integrated with a multi-tenancy quality of algorithm.

5. The method of claim 1, wherein the redundant array of independent disks level comprise a set of redundant array of independent disks configurations employing striping, mirroring, or parity techniques to create large reliable data stores from multiple general-purpose computer hard disk drives.

* * * * *